US010075033B2

(12) United States Patent
Delplace

(10) Patent No.: US 10,075,033 B2
(45) Date of Patent: Sep. 11, 2018

(54) ROTOR OF ROTARY ELECTRICAL MACHINE EQUIPPED WITH EXCITATION WINDING INSULATOR COMPRISING AT LEAST ONE PETAL MODIFIED FOR PASSAGE OF MAGNET DURING ASSEMBLY

(71) Applicant: VALEO EQUIPMENTS ELECTRIQUES MOTEUR, Creteil (FR)

(72) Inventor: David Delplace, Camiers (FR)

(73) Assignee: Valeo Equipments Electriques Moteur, Creteil (FR)

(*) Notice: Subject to any disclaimer, the term of this patent is extended or adjusted under 35 U.S.C. 154(b) by 307 days.

(21) Appl. No.: 14/897,476

(22) PCT Filed: Jun. 11, 2014

(86) PCT No.: PCT/FR2014/051404
§ 371 (c)(1),
(2) Date: Dec. 10, 2015

(87) PCT Pub. No.: WO2014/199074
PCT Pub. Date: Dec. 18, 2014

(65) Prior Publication Data

US 2016/0141925 A1 May 19, 2016

(30) Foreign Application Priority Data

Jun. 14, 2013 (FR) ..................................... 13 55541

(51) Int. Cl.
*H02K 21/12* (2006.01)
*H02K 1/27* (2006.01)
*H02K 3/32* (2006.01)
*H02K 15/02* (2006.01)

(52) U.S. Cl.
CPC ............... *H02K 1/27* (2013.01); *H02K 3/325* (2013.01); *H02K 15/022* (2013.01)

(58) Field of Classification Search
CPC ......... H02K 3/325; H02K 1/27; H02K 15/022
USPC ........ 310/156.66, 194, 195, 257, 261.1, 263
See application file for complete search history.

(56) References Cited

U.S. PATENT DOCUMENTS 5,539,265 A 7/1996 Harris et al.
6,369,485 B1 4/2002 Oohashi et al.
7,982,358 B2 * 7/2011 York .................... H02K 15/022 310/194

(Continued)

FOREIGN PATENT DOCUMENTS

FR 2256572 7/1975
FR 2591399 6/1987

(Continued)

*Primary Examiner* — Hanh Nguyen
(74) *Attorney, Agent, or Firm* — Berenato & White, LLC

(57) ABSTRACT

A rotor (1) of an electrical rotating machine, especially for an alternator or an alternator-starter of a motor vehicle, comprising two polar wheels (7, 8), an excitation winding provided with an insulator (15), and at least one magnetic assembly (13) placed between the two polar wheels which are each provided with teeth (9*a*, 9*b*), the insulator of an excitation winding comprising a plurality of petals (20), wherein at least one of the petals has a side recess (27) for allowing the passage of one of the magnetic assemblies (13) during the assembly of the two polar wheels (7, 8).

20 Claims, 3 Drawing Sheets

(56) References Cited

U.S. PATENT DOCUMENTS

| | | | | |
|---|---|---|---|---|
| 9,030,073 | B2 * | 5/2015 | Leroy | H02K 3/528 310/156.66 |
| 2003/0137208 | A1 * | 7/2003 | York | H02K 3/528 310/194 |
| 2004/0066108 | A1 * | 4/2004 | York | H02K 3/528 310/194 |
| 2006/0290232 | A1 | 12/2006 | Fujita et al. | |
| 2008/0061651 | A1 | 3/2008 | York | |
| 2013/0221798 | A1 * | 8/2013 | Neet | H02K 1/22 310/263 |

FOREIGN PATENT DOCUMENTS

| | | |
|---|---|---|
| FR | 2676873 | 11/1992 |
| FR | 2784248 | 4/2000 |
| FR | 2793085 | 11/2000 |
| FR | 2895165 | 6/2007 |
| FR | 2918220 | 1/2009 |
| WO | WO2008031995 | 3/2008 |
| WO | WO2011058254 | 5/2011 |

* cited by examiner

Figure 6
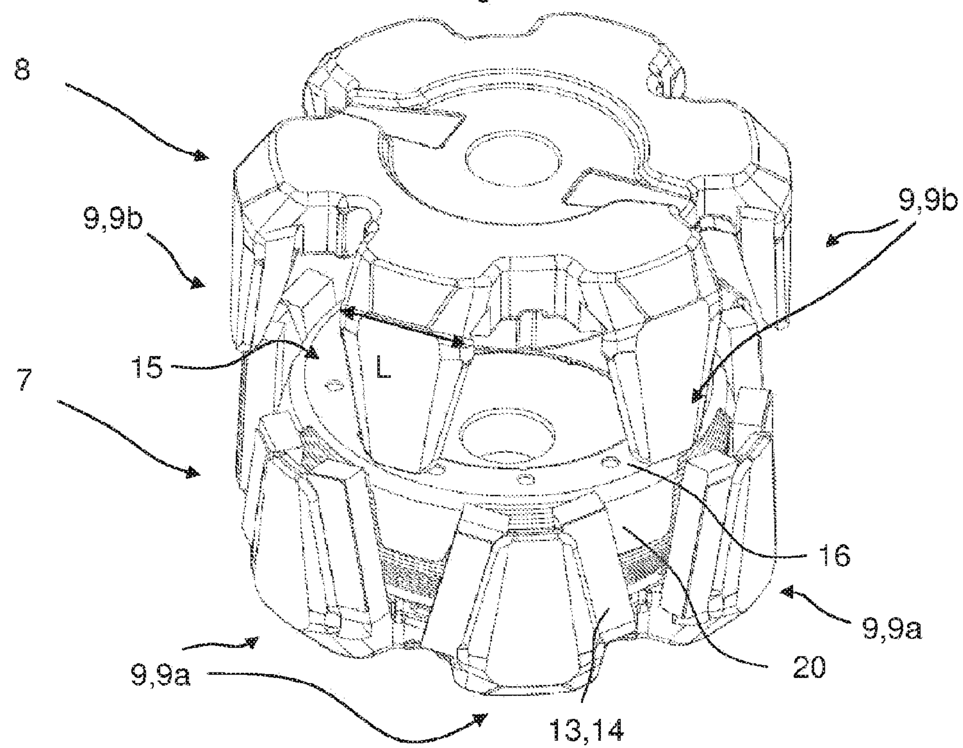
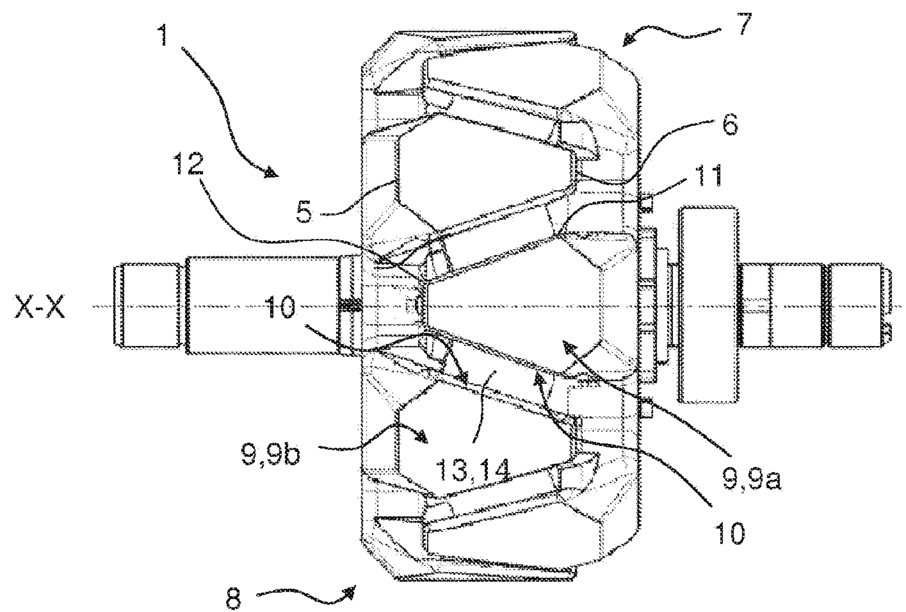
Figure 7

ROTOR OF ROTARY ELECTRICAL MACHINE EQUIPPED WITH EXCITATION WINDING INSULATOR COMPRISING AT LEAST ONE PETAL MODIFIED FOR PASSAGE OF MAGNET DURING ASSEMBLY

CROSS-REFERENCE TO RELATED APPLICATIONS AND CLAIM TO PRIORITY

This application is a national stage application of International Application No. PCT/FR2014/051404 filed Jun. 11, 2014, which claims priority to French Patent Application No. 1355541 filed Jun. 14, 2013, the disclosures of which are incorporated herein by reference and to which priority is claimed.

FIELD OF THE INVENTION

The present invention relates in general to rotary electrical machines.

More specifically, the invention relates to rotary machines of the alternator or alternator-starter type, implemented in motor vehicles.

Even more specifically, the invention relates to rotary electrical machines, the rotor of which comprises claws, teeth and magnets, for example permanent magnets such as rare earth and/or ferrite magnets.

BACKGROUND OF THE INVENTION

The magnets which are arranged between two teeth are used to prevent magnetic flux leakages between the magnetic poles in the form of teeth. In fact, it has been found that a substantial part of the magnetic flux created by the winding of the rotor passed via leakage paths instead of passing through the air gap of the machine, and giving rise to the required induction in the poles of the stator. For this purpose, according to solutions of the prior art, magnets are placed preferentially in pairs between at least some of the consecutive teeth of the magnet wheels, either by means of clips or any other support which is arranged on the tooth and is designed to retain at least one magnet in a specific position, or by means of two grooves provided in one of the lateral edges of the teeth between which the magnet is situated.

In the field, there is already known a rotor of a rotary electrical machine, in particular for an alternator or an alternator-starter of a motor vehicle, comprising an axial axis of symmetry X-X, two magnet wheels each comprising a flange supporting projections which are extended by teeth with axial orientation facing towards the flange of the other magnet wheel, a core between the flanges of the magnet wheels, an excitation winding insulator fitted on the core, a winding, and at least one magnet fitted between two adjacent teeth belonging to one and the other of the magnet wheels, wherein the insulator comprises a sleeve fitted on the core, a front cheek and a rear cheek at each of the ends of the hub, at least one of these cheeks supporting a plurality of projecting petals which are designed to cooperate with the inclined inner periphery of a tooth, at least one petal out of the said plurality of petals having a globally trapezoidal contour, the said petal projecting globally radially in the free state whilst being inclined axially in the direction of the second magnet wheel, and having a large base which is connected to the outer periphery of the cheek, and a small base which is configured to come into contact with the said inner periphery of the said tooth, with at least two opposite faces connecting the said large base and small base.

A rotor of a rotary electrical machine of this type is disclosed in WO2011058254.

The assembly method according to teaching derived from WO2011058254 comprises the following steps:

an insulator equipped with an excitation winding is fitted on a half-core of a first magnet wheel;

at least one magnet is fitted on a tooth of the said first magnet wheel;

the said petal is turned back and folded progressively by contact with the inclined inner periphery of the tooth of the second magnet wheel, making the said petal go from a deployed position to a folded position.

By using a method of this type for fitting of a rotor, it has been found that during the fitting step in which the said petal is turned back and folded progressively by contact with the inclined periphery of the tooth of the second magnet wheel, the passage of the said petal from a deployed position to a folded position was made difficult because of the prior fitting of the said magnet on the tooth of the first magnet wheel. During this aforementioned prior fitting, the magnets are simply deposited and retained by magnetisation on the first magnet wheel.

Thus, during the assembly of the second magnet wheel, the petal which is progressively folded towards the excitation winding is liable to draw these magnets with it. The interpolar magnets are then displaced, such that the rotor obtained at the end of the process must be scrapped.

In other words, when the said petal is turned back and folded, there is at least one intermediate position of the petal according to which the said petal is in the immediate vicinity of, or even crosses, a ridge of the said magnet of the first magnet wheel. In this case, intermediate position means the position in which the said petal is on the point of clearing the magnet which equips the first magnet wheel, without having completely cleared it.

This intermediate position is therefore a position between a first position relating to a deployed state of the said petal, and a second position relating to a folded state of the said petal.

As can be seen in FIG. 1 representing a prior art, in the intermediate position the said magnet which equips the first magnet wheel is very close to the said petal, or even touches the said petal. This immediate vicinity affects the production costs. In fact, in these conditions, during the assembly the said magnet can damage the petal by colliding with it.

In order to eliminate this problem, it is possible for example to equip the rotor with petals with reduced dimensions, or even to reduce the size of the magnets.

These solutions are not satisfactory since the first one referred to reduces the electrical insulation of the coil, and the second one assists magnetic leakage paths.

SUMMARY OF THE INVENTION

In this context, the problem posed here is to propose a rotor of a rotary electrical machine which is simple to construct and permits simplified assembly of the rotor, preferably an assembly wherein a magnet is previously fitted on a tooth of a magnet wheel, as well as to facilitate its implementation. More particularly, the problem to which the present invention relates is to reduce the production costs associated with the deterioration of the components which equip the rotor (in particular the magnet and the petal) during the assembly, whilst optimising the electrical insulation of the coil and impeding magnetic flux leakages.

The subject of the invention is a rotor of a rotary electrical machine, in particular for an alternator or an alternator-starter of a motor vehicle, comprising two magnet wheels, an excitation winding provided with an insulator, and at least one magnetic assembly placed between the two magnet wheels each provided with teeth, the said insulator comprising a plurality of petals.

According to a general characteristic, at least one of the said petals has a lateral recess to permit passage of one of the said magnetic assemblies during the assembly of the two magnet wheels.

For example, at least one face of the petal out of the said at least two faces has the said lateral recess.

A rotor of this type makes it possible to eliminate the aforementioned disadvantages during the assembly.

The present solution offers a good compromise. This lateral recess situated in at least one petal advantageously permits the passage of the magnet when the said petal is in its intermediate position, whilst permitting preservation of the dimensions of the magnet and of the petal. Fitting of a rotor wherein the magnet is previously fitted on a tooth of a rotor becomes possible and easy, whilst eliminating the deterioration of the components such as the magnet or the petal, which could necessitate complete dismantling of the rotor, or even scrapping of the rotor.

According to one embodiment, one of the said plurality of petals projects and is designed to cooperate with the inclined inner periphery of a tooth of the second magnet wheel.

According to one embodiment, the rotor comprises an axis of rotation, and the said two magnet wheels each comprise a flange supporting projections which are extended by the said teeth with axial orientation facing towards the flange of the other magnet wheel, the said at least one magnetic assembly being fitted between two adjacent teeth belonging to one and the other of the magnet wheels.

According to one embodiment, the rotor comprises a core between the magnet wheels, the said insulator being fitted on the core.

According to a characteristic of this embodiment, the insulator comprises a hub which is fitted on the core, a front cheek and a rear cheek at each of the ends of the hub, at least one of these cheeks supporting the said plurality of petals.

According to another embodiment, the at least one petal has a globally trapezoidal contour, the said contour comprising two non-parallel opposite faces which extend towards the exterior of the insulator, the said lateral recess being provided in one of these two faces.

According to a characteristic of this other embodiment, the recess has a longitudinal form with a direction, the direction being more inclined than the direction of the face with which it forms an angle of between 1° and 20°.

This form is particularly suitable for the magnet to avoid the petal, which goes from a deployed position to an inclined position. During the inclination movement, the recess with which the petal is equipped is inclined progressively and simultaneously with the inclination of the petal. By this means, the longitudinal form facilitates the passage of the petal in the vicinity of the magnetic assembly during the inclination of the petal.

In other words, during the bending of the petal, the ridge of the magnetic assembly will be displaced relative to the said recess. This displacement goes from an inner point (closer to the cheek) of the recess, towards an outer point (further away from the cheek, and more eccentric), this displacement not being parallel to the face of the petal, but more inclined, such that the inner point is less deep than the outer point.

Thus, in the case of a recess, the direction of which is parallel to the face, it is necessary to provide along the entire length of the recess a depth which is designed such that the aforementioned outer point does not touch the ridge of the magnetic assembly, whereas this depth is not necessary in order to avoid the petal when, for example, the ridge is situated at the said inner point. Thus, the surface of the recess is substantial, which involves problems of electromagnetic insulation.

On the contrary, by having a direction of recess which is more inclined than the face, i.e. which follows the relative displacement of the ridge in relation to the recess, a variable depth is obtained which is always suitable for the relative position of the ridge. Thus, the surface of the recess is less substantial, which limits the problems of electromagnetic insulation.

According to another characteristic of this other embodiment, the contour has a large base which is connected to the outer periphery of the cheek, and a small base which is configured to come into contact with the said inner periphery of the said tooth, the said two faces connecting the said large base and small base.

According to an additional characteristic, the said recess is closer to the large base than to the small base.

A solution of this type provides improved electrical insulation of the head side of the tooth, and is particularly suitable for the spatial arrangement of the components such as the magnet and the petal, when the petal is in its intermediate position.

According to another additional characteristic, the said large base has a larger dimension than a width of a root of the tooth which is adjacent to it.

This solution provides better cover for the electrical insulation of the tooth in the position of the root of the tooth, in particular in the position of the edges of the inclined inner periphery.

According to one embodiment, a petal of the said plurality of petals which projects globally radially in the free state is placed on the said excitation coil when the said two magnet wheels are fitted.

According to one embodiment, the recess has a longitudinal form with a direction and has the following dimensions:

a length L of between 2.5 and 5 mm, according to the direction of the recess;

in its middle, a depth of between 0.3 and 1.5 mm.

The present solution provides a good compromise between the electrical insulation, which is affected if the recess is too large, and the avoidance of the magnetic element. These dimensions provide a good compromise, and are particularly suitable for alternators and alternator starters which are used in the motor vehicle industry. These dimensions are considered to be particularly relevant in relation to the form of the magnet, the form of the petal, and the movement of inclination of the said petal.

According to one embodiment, the said recess faces one of the said magnetic assemblies.

According to one embodiment, the said recess has a certain length, such that a certain section of one of the said magnetic assemblies can be introduced into the recess.

The said recess can have a certain length, such that a certain section of one of the said magnetic assemblies can be introduced into the recess.

In fact, it is possible for a section of the magnetic assembly with a length to be introduced into the recess during the fitting of the second magnet wheel. The length of the recess must therefore be longer than this section, in order for the magnetic element to be able to be avoided by the petal.

Advantageously, the said recess has a certain length, such that, during its folding, it faces a ridge of one of the said magnetic assemblies.

In fact, during the folding of the petal, the point of the recess which is closest to the ridge of the magnetic assembly is displaced from the base of the recess towards the exterior of the face. The length of the recess must therefore be longer than the course of the point of the recess which is closest to the ridge.

In addition to having a certain depth, the recess advantageously has a certain length which fulfils the two criteria, i.e. that of the section of the magnetic element and that of the course of the point of the recess which is closest to the ridge.

In another embodiment, the said large base has a larger dimension than a width of a root of the tooth which is adjacent to it.

According to another objective, the invention also relates to a method for fitting a rotor of a rotary electrical machine, in particular for an alternator or alternator-starter of a motor vehicle, comprising two magnet wheels provided with teeth, an excitation winding provided with an insulator, and at least one magnetic assembly placed between the two magnet wheels, the said insulator comprising a plurality of petals, comprising the following steps:

fitting of the insulator provided with the petals on the first magnet wheel on which the said magnetic assembly is also fitted;

fitting of the second magnet wheel on the first magnet wheel, during which the petal is turned back and folded progressively by contact with the inclined inner periphery of a tooth of the second magnet wheel, thus making the said at least one petal go from a deployed position to a folded position.

According to a general characteristic of this method, the magnetic assembly is placed facing the recess, such that when the petal is folded it does not collide with the magnetic assembly.

According to one implementation, the said magnetic assembly is accommodated in a groove provided in the tooth of the said first magnet wheel.

This is a particularly favourable step for fitting the said magnet in advance on the tooth of the first magnet wheel.

According to another implementation, the said magnetic assembly is accommodated in a support which is arranged on the tooth of the first magnet wheel, and is designed to retain the said magnetic assembly in a specific position, for example with a clip.

According to another implementation, the middle of a base of the recess is directly facing, and spaced from, a first ridge of the said magnetic assembly.

This is a relative arrangement between the recess and the magnet which is particularly favourable for preventing material from colliding between the petal and the magnet, in view of the inclination of the petal. This assists the passage of the magnet into the recess, between the intermediate and folded positions of the petal.

According to another implementation, the smallest distance which separates a base of the recess and a first ridge of the said magnetic assembly is between 0.5 and 1.5 mm, and is preferably 0.8 mm.

These dimensions provide a good compromise, and are particularly suitable for alternators and alternator-starters used in the motor vehicle industry.

BRIEF DESCRIPTION OF THE DRAWINGS

Other characteristics and advantages will also become apparent from the following description provided by way of indication which is in no way limiting, with reference to the appended drawings in which:

FIG. 6 is a view similar to FIG. 5 in which the petals are in a folded position;

FIG. 7 is a side view of an example of a rotor according to the invention.

DETAILED DESCRIPTION OF THE PREFERRED EMBODIMENT(S)

Figure 1:
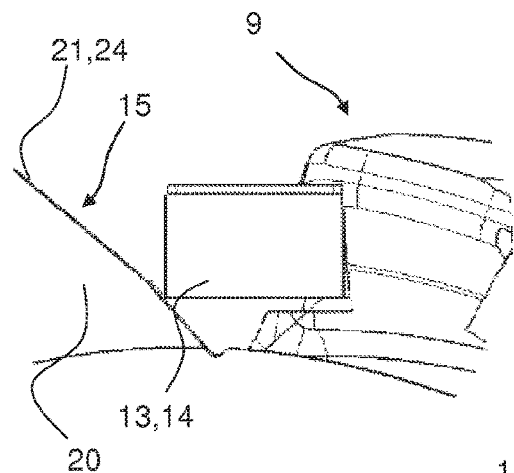
FIG. 1 shows a view from above of an embodiment of a petal according to the prior art.

In the present embodiment, the alternator or alternator-starter for a motor vehicle comprises a housing, a conventional stator and a rotor 1 with a shaft with an axis X-X. In a known manner, the rotor 1 comprises a winding. For further details, reference will be made for example to document FR 2 676 873, which in FIG. 1 discloses the complete structure of the alternator, in this case with internal ventilation, and also to FIG. 1 of document FR 2 793 085, which shows the excitation winding of the rotor.

In the description, the orientations radial, axial and transverse will be used with reference to the axis X-X of the shaft.

Figure 4:
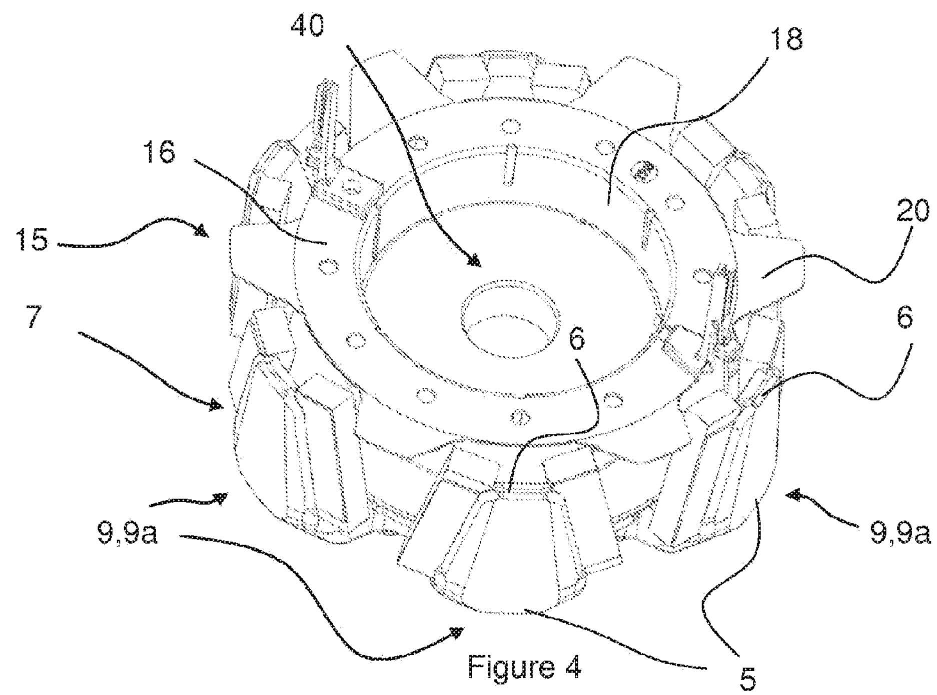
FIG. 4 is a view from above in perspective showing the fitting of the insulator in a front magnet wheel, when the petals are in a deployed position.
Figure 5:
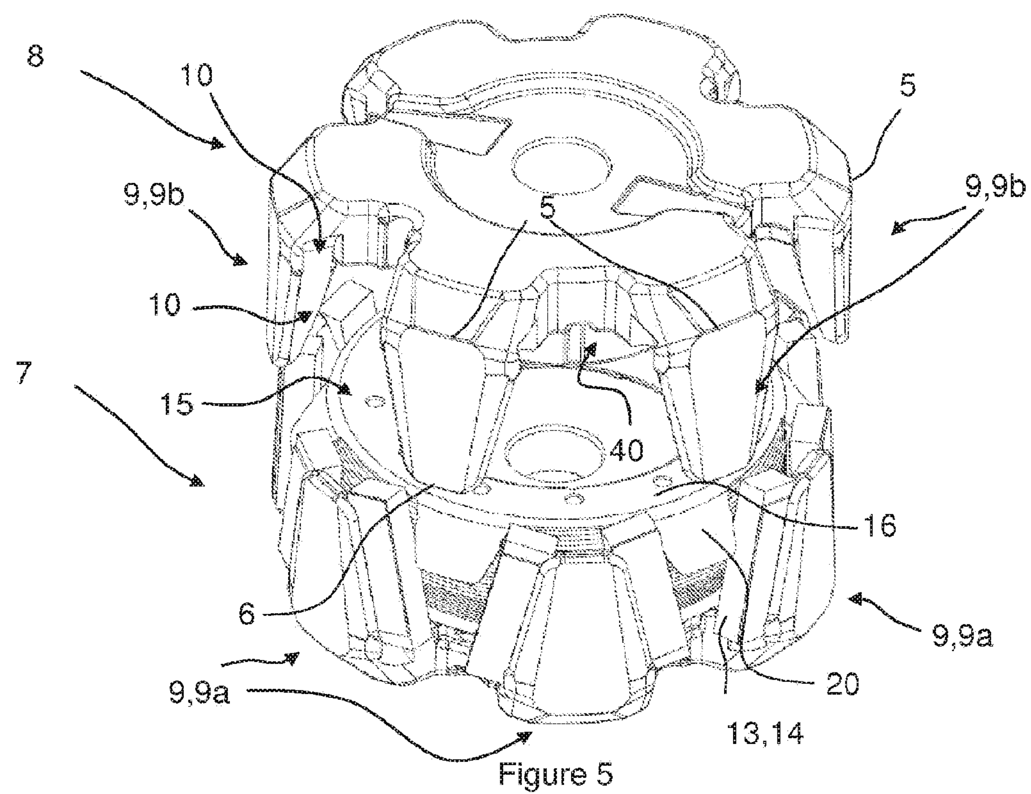
FIG. 5 is an exploded view, and similar to FIG. 4, in which the rear polar wheel is also represented, and wherein the petals are in an intermediate position.

The rotor represented in FIGS. 4 to 6, with an axis of axial symmetry X-X, comprises two magnet wheels 7, 8, preferably made of ferromagnetic material, each comprising a flange supporting projections which are extended by teeth 9 with axial orientation facing towards the flange of the other magnet wheel 7, 8. In particular, these magnet wheels comprise a series of axial teeth 9 with a globally trapezoidal form; it is the part with axial orientation of the teeth 9 which has this globally trapezoidal form. Each tooth 9 extends axially from a root 5 towards a head 6, in the direction of the other magnet wheel (when the rotor is fitted), such that each tooth 9 of a magnet wheel 8, 7 is situated in the space which exists between two consecutive teeth 9 of the other magnet wheel 7, 8. The outer periphery of the teeth 9 delimits the outer periphery of the rotor 1 and the air gap between the rotor and the stator. The thickness of the axial part of the tooth decreases, and is maximum in the position of its root 5, and is minimum in the position of its head 6 which constitutes its free end.

In FIGS. 5 and 6, the rotor 1 comprises a first magnet wheel 7 and a second magnet wheel 8, each having a plurality of teeth 9. The first magnet wheel 7 comprises a first series of claws, each of which has on its outer periphery a tooth **9*a* with axial orientation, and the second magnet wheel comprises a second series of claws, each with a tooth 9*b* with axial orientation on its outer periphery. Each of the teeth 9*a*, 9*b* has at least two opposite lateral surfaces 10, and preferably two opposite lateral surfaces 10. Each of the teeth 9*a*, 9*b* has a lateral surface 10, such that the lateral surface 10 adjacent to the other tooth 9*a*, 9*b* is opposite. The lateral surface 10 comprises first and second opposite ends 11, 12, between which a magnetic assembly 13 is typically in contact. The first end 11 is the closest to the flange of the magnet wheel concerned, and the second end 12 is the closest to the free end, or head 6, of the tooth 9**.

The magnetic assembly 13 comprising at least one interpolar magnet 14 is fitted between two adjacent teeth, respectively 9*a*, 9*b* belonging to one and the other of the magnet wheels 7, 8. The at least one magnet 14 can also comprise another magnet and/or a magnetic element which can be made of the same material as the magnet wheels, or of steel as described for example in document FR 2 918 220 to which reference will be made. The magnet 14 can also be associated with a strip which can be seen in FIG. 2 glued onto the magnet 14, as described in document FR 2 784 248, to which reference will be made.

It will be appreciated that the magnetic assembly can also comprise at least one support wedge which is made of a non-magnetic material and is fitted on a transverse end surface of the magnet, and means for connection with the wedge, as described in document FR 2 895 165 to which reference will be made.

Preferably, in order to fit the magnetic assembly 13 on the claws, grooves 10*a* are provided in the lateral surfaces 10 of the teeth 9. A procedure for fitting a magnetic assembly of this type between these first and second claws is described for example in applications FR 2 784 248, FR 2 918 220 and FR 2 895 165. It will be appreciated that the thickness of the magnetic assembly 13 depends on the thickness of the axial part of a claw.

The magnetic assembly 13 has a substantially parallelepiped form, but it is conceivable for this form to be adapted according to the conformation of the interpolar space defined between the teeth, respectively 9*a* and 9*b*. A priori the magnetic assembly 13 has a homogenous appearance with substantially flat surfaces.

The magnetic assembly 13 is contained in the interpolar space defined between the first series of claws of the first magnet wheel and the second series of claws of the second magnet wheel.

In a known manner, the rotor can comprise a plurality of magnetic assemblies 13 incorporated between a claw of the first magnet wheel 7 and a claw of the second magnet wheel 8. In the case when magnetic assemblies 13 equip the interpolar spaces contained between two consecutive claws of a single magnet wheel, a pair of magnetic assemblies will thus be formed. The number of pairs of magnetic assemblies can be lower than, or equal to, the number of pairs of poles of the magnet wheels. Consequently, persons skilled in the art can arrange magnetic assemblies of the same type as those previously described such that a series of magnetic assemblies is arranged between each interpolar space defined between the first and second series of claws.

According to one embodiment, the magnetic assemblies can be retained in place by retention elements made of magnetic material and in the form of a “C”, as described in U.S. Pat. No. 7,420,314. This retention element can in particular be in the form of a clip.

Each magnet wheel 7, 8 comprises a half-core 40. Conventionally, once it has been fitted, the rotor then comprises two half-cores 40, with an insulator 15 for an excitation winding fitted on at least one of the half-cores 40. The insulator 15 is fitted on at least one of the half-cores between the flanges of the magnet wheels 7, 8.

In a known manner, this core can be distinct from the magnet wheels 7, 8, or, as a variant, as described in document FR 2 256 572, it can be in two parts each integral with one of the magnet wheels 7, 8.

The insulator 15 is made of electrically insulating material, preferably of plastic material. It has a hub with axial orientation which is provided at one of its axial ends at least with a cheek with transverse orientation. The insulator comprises a cylindrical sleeve fitted on the core, a front cheek 16 and a rear cheek (not represented) at each of the ends of the hub 18.

In FIGS. 4 to 6 the sleeve is fitted with centring on the core of the rotor, whereas the front and rear cheeks are each designed to be adjacent to, or even to come into contact with one of the flanges of a magnet wheel 7, 8. Preferably, slight fitting play exists between the front and rear cheeks and the flanges of the wheels 7, 8.

The winding is wound in this insulator 15, which acts as a support for this winding.

At least one of the front 16 and rear cheeks supports a plurality of projecting petals 20 which are designed to cooperate with the inclined inner periphery of a tooth 9. Preferably, each front 16 and rear cheek has projecting petals 20, which, in the initial state, i.e. in the free state, are deployed and have globally radial orientation, and define a deployed position; FIG. 4 illustrates this state. These petals 20 are inclined slightly axially initially in the direction of the magnet wheel 7, 8 concerned. The petals 20 are conformed to be turned back and folded in order each to come into contact with the inner periphery of a tooth 9 of the rotor 1.

In the front view of the petal 20, i.e. when the insulator 15 is concentric to the axis X-X, the petals 20 have a globally trapezoidal contour 21, each petal 20 projecting globally radially in the free state, whilst being inclined axially in the direction of the second magnet wheel 8.

Figure 3:
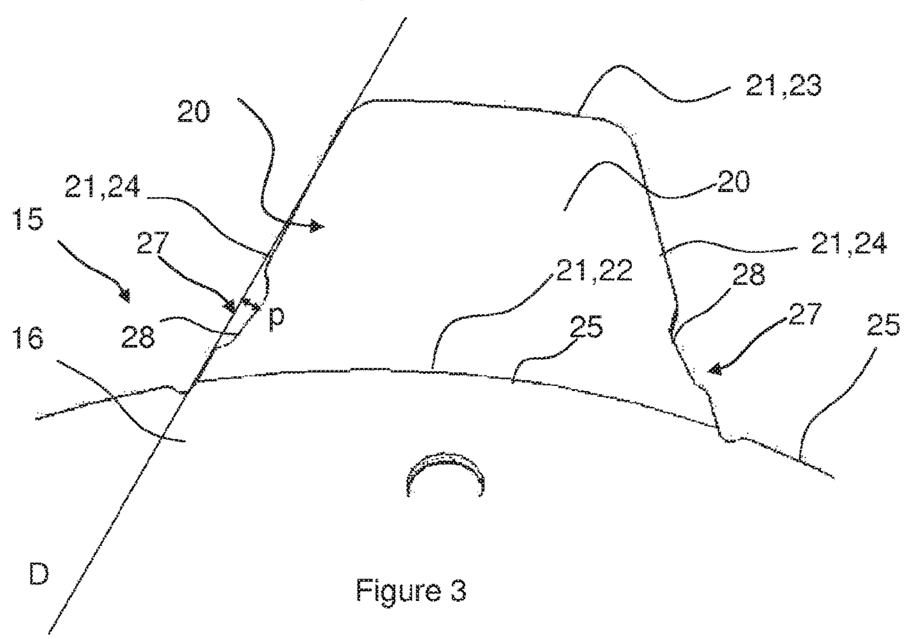
FIG. 3 shows the petal and partially the front cheek of the insulator, in front view.

Conventionally, as shown in FIG. 3, a petal 20 has a large base 22, a small base 23, and at least two opposite faces 24 which connect the said large base 22 and the said small base 23; the large base 22 is connected to the outer periphery 25 of the cheek 16 with transverse orientation, such that it is rooted in this cheek 16; the small base 23 is configured to come into contact with the inner periphery of the tooth 9.

The petal 20 projects globally in the free state whilst being inclined axially in the direction of the magnet wheel 7, 8 concerned (generally the rear magnet wheel 8). The angle of inclination of a petal 20 in the free state corresponding to a deployed state relative to a transverse plane is in this case approximately 10%. This angle depends on the applications, and makes it possible to wind the winding well without being impeded by the petals 20.

The dimensions of the petal 20 are conformed according to the dimension of the inclined inner periphery with a globally trapezoidal form of the tooth 9. A configuration of this type improves the electrical insulation of the winding relative to the inner periphery of the tooth 9 and the performance of the rotor 1. Typically, this petal 20 finally covers at least part of the inner periphery of the tooth, preferably without extending from the contour of this periphery.

Advantageously, at least one face 24 out of the said at least two faces 24 has a lateral recess 27. Preferably, the said recess 27 is closer to the large base 22 than to the small base 23.

As can be seen in FIG. 3, the recess 27 has a contour which extends longitudinally. Preferably, the direction of the contour of the recess is more inclined towards the axis of rotation of the rotor and the cheek 16 than the direction of the face 24. In other words, as can be seen in FIG. 3, in a first embodiment, the thickness of the recess relative to the face increases linearly when moving away from the cheek 16, then, when continuing to move away to the end of the recess, this thickness is reduced. For example, the direction of the recess forms an angle of between 1° and 20° with the direction of the face.

According to one embodiment, the large base 22 has a larger dimension than a width L of the root 5 of the tooth 9 which is adjacent to it.

According to one embodiment, at least one magnet 14 is accommodated in a groove 10*a* provided in the tooth 9 of the said first magnet wheel 7. Document WO2011/058254 shows an example of a method of this type for fitting of the magnetic assembly.

According to another embodiment, at least one magnet 14 is accommodated in a support which is arranged on the tooth 9, and is designed to retain the said magnet 14 in a specific position. Document U.S. Pat. No. 6,369,485 shows an example of a method of this type for fitting of the magnetic assembly 13.

According to one embodiment, the magnetic assembly 13 comprising the magnet 14 is accommodated in the interpolar space between the teeth 9*a* and the teeth 9*b*, and is received in the grooves provided in the lateral surfaces 10 of each of the teeth 9*a*, 9*b* which are opposite.

Consequently, persons skilled in the art can arrange magnetic assemblies 13 of the same type as those previously described such that a series of magnetic assemblies is arranged between each interpolar space defined between the teeth 9 of the first and second magnet wheels 7, 8.

Conventionally, the magnetic assemblies 13 are fitted in advance on one of the magnet wheels 7, 8 as described on page 10 of document WO 2008/031995, since the petals 20 are initially deployed.

Conventionally, the fitting grooves in the magnets, the inner bore and the outer periphery of the magnet wheels are machined in advance, using lubricated tools without risk of projection of chips onto the winding which is not present at this stage. The assembly method then consists of fitting the insulator 15 with its winding on the half-cores 40 of the magnet wheels 7, 8, then, after angular positioning of the two wheels, for example by means of fingers which are interposed temporarily between the projections of the magnet wheel concerned, the half-cores 40 are pressed by means of a compacting press against one another for satisfactory passage of the magnetic flux. Then, the shaft is fitted in the central bores in the magnet wheels without destruction of the angular positioning of the magnet wheels, and finally, by means of a tool, there is deformation of the material of the magnet wheels for penetration into the striated crimping areas of the shaft. Thus, the magnetic assemblies are fitted in the groove which does or does not open out of a first magnet wheel 7, then, the second magnet wheel 8 is brought into the correct angular position, in the knowledge that this wheel can be turned without difficulty. In this step, the second magnet wheel 8 is brought axially towards the first magnet wheel 7, such that the ends of the magnetic assemblies 13 supported by the first magnet wheel 7 can come into contact with the deployed petals 20 of the cheek 16 associated with the second magnet wheel 8, which is then spaced axially from the first magnet wheel 7.

More specifically, the heads 6 of the teeth 9*b* of the second magnet wheel 8 come progressively via their inclined inner periphery into contact with the petals 20 of the cheek 16 which is associated with the second magnet wheel 8, in order to turn back and therefore fold the petals 20 of this cheek 16.

Figure 2:
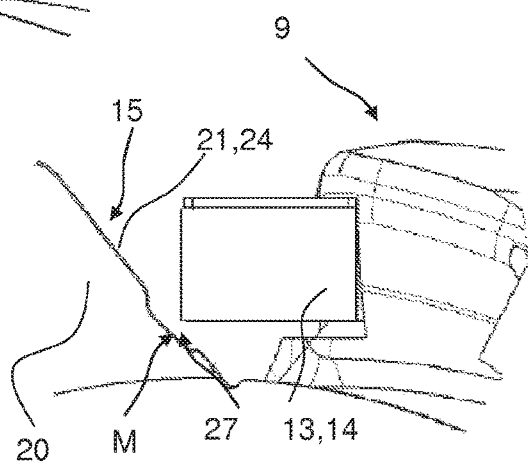
FIG. 2 is a view similar to FIG. 1 showing the petal, and in particular the passage of the magnetic assembly in the immediate vicinity of the recess, when the petal is in the intermediate position.

Thus, the recess 27 according to the present invention makes it possible to prevent the petal 20 colliding with the magnetic assembly 13 fitted on the first wheel 7, by going from a deployed position to a folded position. It is thus possible to continue to bring the two magnet wheels 7 and 8 towards one another axially, then to put the two half-cores of the magnet wheels 7 and 8 into close contact under pressure, during the compacting operation, without encountering assembly difficulties. As can be seen in FIG. 2, the petal 20 therefore does not interfere with the magnetic assembly 13 of the first magnet wheel 7, and this consequently avoids breakage of the magnet or the petal equipping the magnetic assembly 13, which could occur when the two magnet wheels 7, 8 continue to be brought axially towards one another, or when the two half-cores of the magnet wheels 7, 8 are put into close contact under pressure, during the compacting operation.

In an embodiment shown in FIGS. 4 to 6, the magnetic assemblies 13 are designed to be fitted firstly on the teeth 9*a* of the first magnet wheel. In this embodiment, with the grooves already having been machined respectively in the first and second magnet wheels 7, 8, the insulator 15 equipped with the excitation winding is fitted on the half-core 40 of the front wheel 7. During this step, the petals 20 of the front cheek 16 are turned back and folded progressively by contact with the inclined inner periphery of the teeth 9. Preferably, these petals 20 are wider circumferentially in the position of their large bases 22 than the projections of the transverse flange and the root 5 of a tooth 9 of the front wheel 7.

In a second step, the magnetic assemblies 13 are inserted in the grooves in the teeth 9*a* of the front wheel 7, from the front towards the rear according to the axis XX, the open ends of the groove on the root 5 side of the tooth 9*a* making this possible. In this case, the movement is limited because of the presence of the closed end of the groove in the head 6 side of the tooth 9*a*.

According to another embodiment, the grooves are closed at each of their ends: the magnetic assemblies 13 are then fitted laterally, which is made possible by the absence of the rear wheel 8 at this stage. According to another embodiment, the magnetic assemblies are fitted from the rear towards the front in the grooves in the front wheel 7, which are open in the position of the free end of the teeth on the root 5 side of the teeth 9*a*.

Then, the rear magnet wheel 8 is brought axially towards the front magnet wheel 7 equipped with the magnetic assemblies 13 and the insulator 15 in which the winding is wound. During this axial bringing towards one another, the petals 20 of the front cheek 16 are not yet folded. It is at this moment of the assembly that the lateral recess 27 permits: bringing towards one another of the magnet wheels 7, 8 and simultaneous passage of the magnetic assembly which equips the front magnet wheel 7 into the recess 27 in the petal 20 of the front cheek 16. The petals 20 can then be progressively folded by contact with the inclined inner periphery of the teeth 9*b* of the rear magnet wheel 8.

In order to avoid this collision, the following embodiments of the recess 27 are particularly advantageous:

the recess 27 has a longitudinal form which is inclined relative to the general direction D of the face 24;

the recess 27 has a length L of between 2.5 and 5 mm, and in its middle M the recess 27 has a depth p of between 0.3 and 1.5 mm.

According to another objective of the invention, the assembly method comprises the following steps:

the insulator 15 equipped with an excitation winding is fitted on the half-core of the first magnet wheel 7;

the said at least one magnetic assembly 13 is fitted on the tooth of the said first magnet wheel;

the said at least one petal 20 is turned back and folded progressively by contact with the inclined inner periphery of a tooth 9 of the second magnet wheel 8, thus making the said at least one petal 20 go from a deployed position to a folded position;

the said at least one magnetic assembly 13 is placed opposite the recess 27 situated in the second magnet wheel 8.

In a variant, the middle M of a base 28 of the recess 27 is directly opposite, and spaced from, a first ridge 13*a* of the said at least one magnetic assembly 13, the magnetic assembly 13 preferably having a parallelepiped form.

In another variant, the smallest distance d which separates the base 28 from the recess 27 and the first ridge 13*a* of the said at least one magnetic assembly 13 is between 0.5 and 1.5 mm, and is preferably 0.8 mm.

According to another objective of the present invention, an alternator, in particular of a motor vehicle, is equipped with a rotor 1 of a rotary machine as defined according to one of the preceding combinations.

The invention claimed is:

1. A rotor (1) of a rotary electrical machine, comprising:

first and second magnet wheels (7, 8);

an excitation winding provided with an insulator (15); and at least one magnetic assembly (13) placed between said first and second magnet wheels each provided with teeth (9*a*, 9*b*), said insulator comprising a plurality of petals (20), wherein at least one of said plurality of petals has a lateral recess (27) to permit passage of one of said magnetic assemblies (13) during the assembly of said first and second magnet wheels (7, 8).

2. The rotor (1) according to claim 1, wherein one of said plurality of petals (20) projects and is configured to cooperate with an inclined inner periphery of one of said teeth (9) of said second magnet wheel (8).

3. The rotor (1) according to claim 1, further comprising an axis of rotation (X-X), wherein each of said first and second magnet wheels (7, 8) comprises a flange supporting projections which are extended by said teeth (9) with axial orientation facing towards the flange of the other magnet wheel (7, 8), and wherein said at least one magnetic assembly (13) is fitted between two adjacent teeth (9) belonging to one and the other of said first and second magnet wheels (7,8).

4. The rotor (1) according to claim 1, further comprising a core between said first and second magnet wheels (7, 8), wherein said insulator (15) is fitted on the core.

5. The rotor (1) according to claim 1, wherein said insulator (15) comprises a hub (18) fitted on the core, a front cheek (16) and a rear cheek at each of ends of said hub (18), and wherein at least one of said front and rear cheeks supports said plurality of petals (20).

6. The rotor (1) according to claim 1, wherein at least one of said plurality of petals (20) has a generally trapezoidal contour (21), wherein said contour (21) comprises two non-parallel opposite faces (24) which extend towards an exterior of said insulator, and wherein said lateral recess (27) is provided in one of said two faces.

7. The rotor (1) according to claim 6, wherein said recess (27) has a longitudinal form with a direction, and wherein said direction of said recess (27) is more inclined than the direction of said face (24) with which said direction of said recess (27) forms an angle of between 1° and 20°.

8. The rotor (1) according to claim 6, wherein said contour (21) has a large base (22) connected to an outer periphery (25) of said cheek (16), and a small base (23) configured to come into contact with said inner periphery of said tooth (9), and wherein said two faces connect said large base (22) and said small base (23).

9. The rotor (1) according to claim 8, wherein said recess (27) is closer to said large base (22) than to said small base (23).

10. The rotor (1) (1) according to claim 8, wherein said large base (22) has a larger dimension than a width of a root (5) of said tooth (9) which is adjacent to said root (5).

11. The rotor (1) according to claim 1, wherein one of said plurality of petals generally radially in a free state is placed on said excitation winding when said first and second magnet wheels (7, 8) are fitted.

12. The rotor (1) (1) according to claim 1, wherein said recess (27) has a longitudinal form with a direction and has the following dimensions:

a length (L) of between 2.5 and 5 mm, according to said direction of said recess (27);

a depth (p) of between 0.3 and 1.5 mm in a middle (M) of said recess (27).

13. The rotor (1) (1) according to claim 1, wherein said recess (27) faces said at least one magnetic assembly (13).

14. The rotor (1) according to claim 1, wherein said recess (27) has a certain length, such that during bending of one of said plurality of petals (20), said recess (27) faces a ridge of said at least one magnetic assembly (13).

15. The rotor (1) according to claim 1, wherein said recess (27) has a certain length, such that a certain section of said at least one magnetic assembly (13) is configured to be introduced into said recess (27).

16. A fitting method for fitting a rotor (1) of a rotary electrical machine, said rotary electrical machine comprising:

first and second magnet wheels (7, 8) each provided with teeth (9*a*, 9*b*);

an excitation winding provided with an insulator (15): and at least one magnetic assembly (13) placed between said first and second magnet wheels, said insulator comprising a plurality of petals (20);

said method comprising the following steps:

fitting of said insulator (15) provided with said petals on said first magnet wheel (7) on which said at least one magnetic assembly (13) is also fitted;

fitting of said second magnet wheel (8) on said first magnet wheel (7), during which at least one of said petals (20) is turned back and folded progressively by contact with an inclined inner periphery of one of said teeth (9*b*) of said second magnet wheel (8), thus making said at least one of said petals (20) go from a deployed position to a folded position, wherein said at least one magnetic assembly (13) is placed facing a recess (27) of at least one of said petals, such that when said at least one of said petals (20) is folded, said at least one of said petals (20) does not collide with said at least one magnetic assembly (13).

17. The fitting method according to claim 16, wherein said at least one magnetic assembly (13) is accommodated in a groove provided in one of said teeth (9) of said first magnet wheel (7).

18. The fitting method according to claim 17, wherein said at least one magnetic assembly (13) is accommodated in a support arranged on one of said teeth (9) of said first magnet wheel, and is configured to retain said at least one magnetic assembly (13) in a specific position.

19. The fitting method according to claim 18, wherein a middle (M) of a base (28) of said recess (27) is directly facing and spaced from a first ridge (13*a*) of said at least one magnetic assembly (13).

20. The fitting method according to claim 16, wherein a smallest distance separating a base (28) of the recess (27) and a first ridge (13*a*) of said at least one magnetic assembly (13) is between 0.5 and 1.5 mm.

* * * * *